R. C. HILTON.
HOSE COUPLING.
APPLICATION FILED JUNE 27, 1917.
1,263,557.
Patented Apr. 23, 1918.
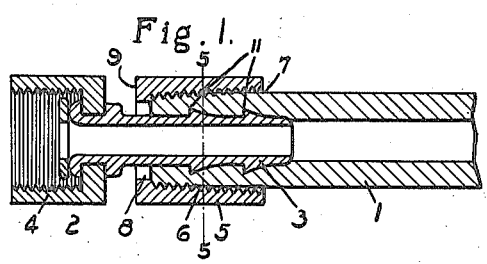
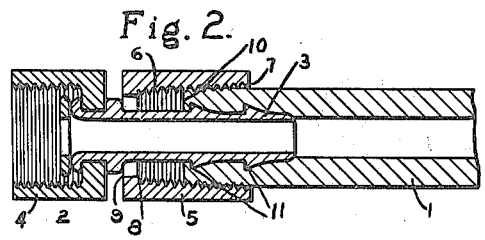
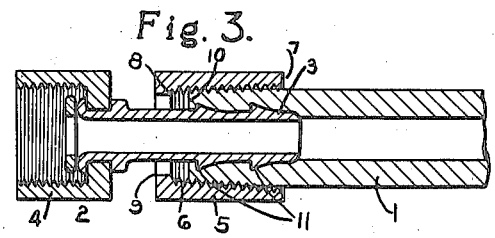
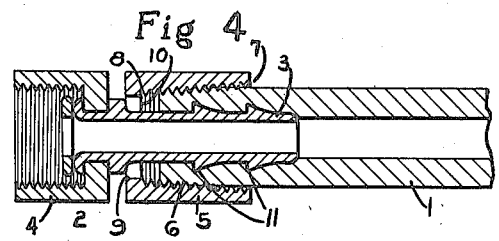
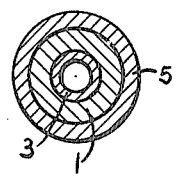
Inventor.
Roland C. Hilton
Attys.

UNITED STATES PATENT OFFICE.

ROLAND C. HILTON, OF KEENE, NEW HAMPSHIRE, ASSIGNOR TO HILTON UNIVERSAL AIR PUMP COMPANY, OF BOSTON, MASSACHUSETTS, A VOLUNTARY ASSOCIATION.

HOSE-COUPLING.

1,263,557.     Specification of Letters Patent.     Patented Apr. 23, 1918.

Application filed June 27, 1917. Serial No. 177,227.

*To all whom it may concern:*

Be it known that I, ROLAND C. HILTON, a citizen of the United States, residing at Keene, county of Cheshire, State of New Hampshire, have invented an Improvement in Hose-Couplings, of which the following description, in connection with the accompanying drawing, is a specification, like characters on the drawing representing like parts.

This invention relates to hose couplings and has for its object to provide a novel construction by which a flexible pipe or hose can be attached to a metallic coupling member so as to produce a tight connection which will withstand high pressures without leaking. While the invention may be used for coupling any flexible pipe to a coupling member, it is especially advantageous for use in connecting the flexible pipe from an air pump to a coupling member such as is used for connecting the air pump to a pneumatic tire. I wish to make it clear, however, that the invention is not limited to this particular use, but is capable of general use.

In order to give an understanding of my invention, I have illustrated in the drawings a selected embodiment thereof which will now be described, after which the novel features will be pointed out in the appended claim.

Figure 1 is a sectional view showing a coupling made in accordance with my invention;

Figs. 2, 3 and 4 are views showing the way in which the coupling is manipulated to attach the flexible hose or pipe to the coupling member.

Fig. 5 is a section on the line 5—5, Fig. 1.

1 indicates a flexible hose or pipe which may be made of any suitable material, but which will preferably be one having its outer surface formed of fibrous material, such, for instance, as would be provided in a pipe having a braided or woven exterior. The coupling member to which the pipe 1 is to be secured is indicated generally at 2 and is herein shown as a swivel connection adapted to be attached to the valve stem of a pneumatic tire. This coupling member is provided with the ribbed stem or nipple 3 which is inserted into the end of the flexible pipe 1 and it is also provided with the swivel coupling member 4 that is adapted to be screwed onto the valve stem of a pneumatic tire in usual manner.

In accordance with my invention the pipe 1 is firmly connected to the stem or nipple 3 of the coupling member 2 by means of a clamping member 5 which is in the form of a sleeve, the internal diameter of which is larger at the outer end 7 than at the inner end 8 and which is provided with the screw-threads 6 extending from the outer to the inner end. The clamping member is also preferably provided with the lip or flange 9 at its inner end. The smaller diameter of the clamping member 5 at its inner end 8 is slightly less than the diameter of the pipe 1 after the nipple portion 3 has been inserted thereinto. In using the device the sleeve is first placed over the nipple with the end 7 of larger diameter toward the end of the nipple, said sleeve being placed so that the flange 9 thereof will rest against the coupling member 4. The end of the pipe 1 is then forced over the nipple 3, said end of the pipe entering the clamping member 5 during this operation. The pipe is forced over the nipple and into the sleeve 5 as far at it will go or until the end 10 of the pipe engages the tapered screw-threaded portion 6 of the sleeve, as seen in Fig. 2. The sleeve is then turned and the action of the screw-threads 6 on the pipe 1 will screw the sleeve 5 longitudinally of the pipe into the position shown in Fig. 3. This screwing movement of the sleeve will move the latter away from the coupling member 4 so as to provide a space between the coupling member and clamping member. The pipe 1 is then pushed farther onto the nipple 3, and since the coupling member 5 is screw-threaded onto the end of the pipe, this movement will carry the nipple toward the coupling member 4, as shown in Fig. 4. The coupling member 5 is then turned again to screw-thread it still farther onto the pipe 1, thus separating it from the coupling member 4, and if this second screw-threading operation does not bring the flange 9 against the end 10 of the pipe 1, then the above operations will be repeated, the pipe with the coupling sleeve thereon being forced farther onto the nipple 3, after which the coupling member 5 will be turned to screw it farther over the end of the pipe 1. The nipple 3 is provided with the usual ribs or steps 11, and these ribs or steps prevent the backward movement of the pipe 1 while the coupling member 5 is being screw-threaded onto the pipe.

It is desirable that the exterior surface of the pipe 1 should be such as to afford a proper grip for and resistance to the screw-threads 6. I find that a pipe which is provided with a woven, knitted or braided covering is eminently practicable for this purpose because the screw-threads 6 will obtain a sufficient hold in such a surface as to form screw-threads therein. A pipe with a friable or soft surface would not answer because the screw-threads would strip the surface of the pipe and would not cut corresponding screw-threads therein which have strength enough to advance the coupling member as it is turned.

If it is desired to disconnect the pipe from the coupling member, this can readily be done by reversing the above-described operations, that is, by first backing off the coupling member 5 from the position shown in Fig. 1 to that shown in Fig. 4. Then partially withdrawing the pipe from the nipple 3 and then turning the coupling member 5 so as to back it off still farther from the end of the pipe 1 and then withdrawing the pipe from the nipple.

The construction above described is very simple and the connection can be quickly and effectively made.

The above construction provides a coupling which will securely hold the pipe to the coupling member and which will withstand high internal pressures without leaking.

I claim:

The method of coupling a flexible pipe to a coupling member having a ribbed nipple which consists in placing over the nipple a coupling sleeve, with the inner end of said sleeve abutting the coupling member, said sleeve having internal tapering screw threads with the end of larger diameter toward the end of the nipple, inserting the end of a flexible pipe over the nipple and into the coupling sleeve, screw threading the coupling sleeve onto said pipe end, thus moving the sleeve away from the coupling member, then forcing said pipe with the coupling sleeve thereon farther onto the nipple until the coupling sleeve approaches or again abuts the coupling member and again screw threading the coupling sleeve onto said pipe end thereby to make a tight joint.

In testimony whereof, I have signed my name to this specification.

ROLAND C. HILTON.